United States Patent [19]
Henry et al.

[11] Patent Number: 5,951,676
[45] Date of Patent: Sep. 14, 1999

[54] APPARATUS AND METHOD FOR DIRECT LOADING OF OFFSET REGISTER DURING POINTER LOAD OPERATION

[75] Inventors: G. Glenn Henry; Terry Parks, both of Austin, Tex.

[73] Assignee: Integrated Device Technology, Inc., Santa Clara, Calif.

[21] Appl. No.: 08/903,056

[22] Filed: Jul. 30, 1997

[51] Int. Cl.[6] .................................................. G06F 9/312
[52] U.S. Cl. .............................. 712/225; 710/5; 710/260; 711/208
[58] Field of Search ........................... 711/208; 395/566, 395/825; 710/260, 5; 712/225

[56] References Cited

U.S. PATENT DOCUMENTS

| | | | |
|---|---|---|---|
| 4,385,352 | 5/1983 | Bienvenie | 711/208 |
| 5,379,392 | 1/1995 | Alferness et al. | 711/5 |
| 5,812,813 | 9/1998 | Henry et al. | 712/218 |

*Primary Examiner*—Kenneth S. Kim
*Attorney, Agent, or Firm*—James Huffman

[57] ABSTRACT

An apparatus and method for loading a pointer into a selector register/general purpose register pair is provided. The apparatus and method utilizes a single micro instruction to load an offset directly into the general purpose register, during the write back stage of a pipeline, while storing the old value in the general purpose register into a temporary register, in an earlier stage in the pipeline. Thus, the general purpose register is overwritten with the offset before the selector load completes. If the selector load operation fails, the general purpose register may be restored from the temporary register.

26 Claims, 6 Drawing Sheets

Pipeline flow for LDS CX,M Instruction 　　　/ 700

| Cycle | Fetch | Translator | Register | Address | Data | Write Back | |
|---|---|---|---|---|---|---|---|
| 1 | LDS CX,M | | | | | | |
| 2 | X | LOAD.S CX,M | | | | | |
| 3 | | LOAD DS,M | LOAD.S CX,M | | | | |
| 4 | | LOAD Desc | LOAD DS,M | LOAD.S CX,M | | | |
| 5 | | X | LOAD Desc | LOAD DS,M | LOAD.S CX,M | | |
| 6 | | | X | LOAD Desc | LOAD DS,M | LOAD.S CX,M | ⎫ |
| 7 | | | | X | LOAD Desc | LOAD DS,M | ⎬ 3 clocks |
| 8 | | | | | X | LOAD Desc | |
| . | | | | | | X | ⎭ |

FIG. 8

APPARATUS AND METHOD FOR DIRECT LOADING OF OFFSET REGISTER DURING POINTER LOAD OPERATION

BACKGROUND

1. Field of the Invention

This invention relates in general to the field of segment register and offset loading and more particularly to an improved method and apparatus for fast loading of a selector/offset pointer.

2. Description of the Related Art

Within computer systems, microprocessors are used to execute instructions that operate on data stored in memory. Retrieval of instructions, and retrieval and storage of data is performed by reading from and writing to particular memory locations. The particular memory locations each have an address that is designated by the microprocessor at the time of a read or a write operation.

Within x86 computer systems, memory is often divided into a number of different memory segments, each having its own set of privileges and characteristics. This is referred to as memory segmentation. An example of a segmented memory 100 is provided in FIG. 1, where a physical memory 102 is divided into a number of different memory segments 104, 106, 108 and 110. The memory segments are accessed by referencing one of a plurality of segment registers 112 as an operand in a processor instruction, either explicitly or implicitly. The segment registers 112 contain a 16-bit selector that references a particular descriptor 114. The descriptor 114 defines the attributes of a memory segment, including a base address 116 for a memory segment. Particular memory locations within a memory segment are then determined by specifying an offset from the base address as a second operand.

One scheme that has been developed to access particular memory locations utilizes a pointer to define an address for a memory location. A pointer is a data type that contains a value that gives the address of a datum within a memory location. Pointers are useful for building complex data structures such as lists and trees that vary dramatically in structure as a program executes. Each element in a list or tree structure contains one or more pointers to other elements, so that elements can be linked and unlinked simply by storing addresses of other elements in these pointers.

Figure 2:
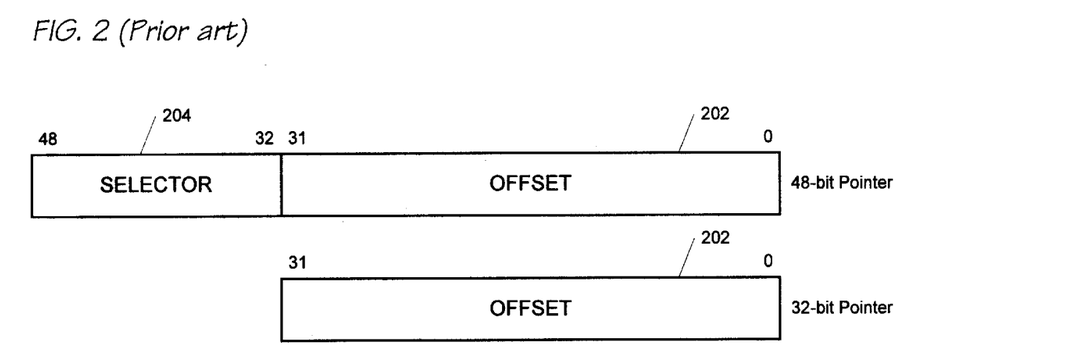
FIG. 2 is a block diagram illustrating a full 48-bit pointer and a 32-bit pointer.

Referring to FIG. 2, two types of pointers are shown. The first type is a 48-bit full pointer that contains a two-part address. The offset part 202 is in the low-order 32-bits, and the segment selector 204 is in the high order 16-bits. To address data with a 48-bit pointer, the two parts must be loaded into registers within a microprocessor. The segment selector 204 in the high order 16-bits is loaded into one of the segment registers (shown below in FIG. 3). The offset part 202 in the low-order 32-bits is loaded into one of the general registers of a microprocessor (not shown). If all the addresses to be stored in pointers have the same segment part, a selector is stored in a dedicated segment register, and only the offsets are provided as operands in instructions.

Figure 3:
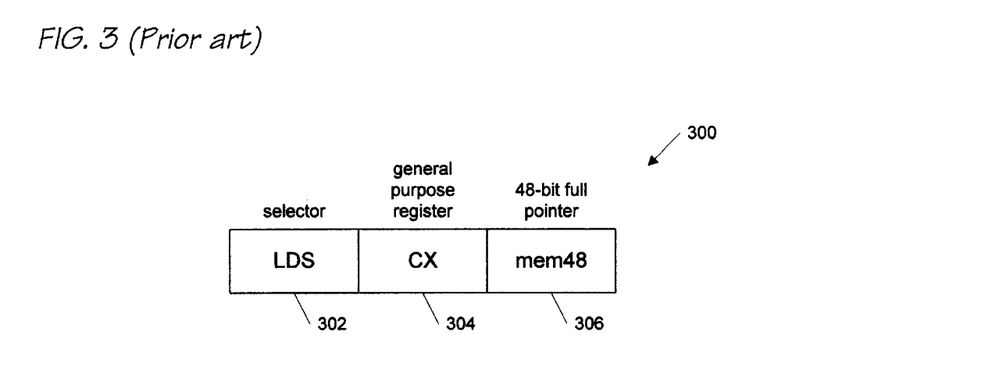
FIG. 3 is a block diagram illustrating the fields of a pointer load macro instruction.

As was mentioned above, to reference a particular memory location using a pointer, the pointer must first be loaded into a segment register/general register pair within a microprocessor. A macro instruction 300 that performs this load operation is shown in FIG. 3.

Figure 1:
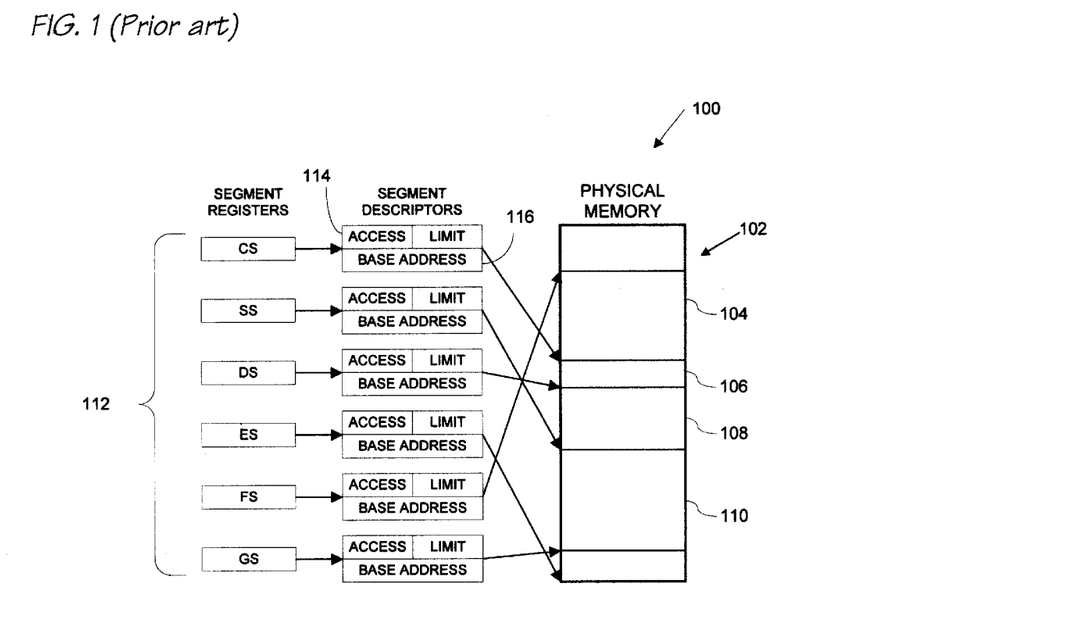
FIG. 1 is a multi-segment model illustrating a prior art segmentation mechanism.

The macro instruction 300 contains an opcode 302 that specifies the instruction as a pointer load instruction, and specifies the segment register to be loaded. In FIG. 3, the DS segment register has been designated. If one of the other segment registers 112 illustrated in FIG. 1 are to be loaded with a pointer, that segment register would be specified in the opcode 302, accordingly.

Within the load pointer instruction 300, an operand 304 is also specified, that indicates the general purpose register that should be loaded with the 32-bit base address. In FIG. 3, the CX register has been designated. However, one skilled in the art will appreciate that one of the other general purpose registers may be specified.

Finally, a memory address 306 is provided that stores the 48-bit pointer to be loaded. The double word found at mem48 is loaded into the general purpose register 304, and the word found at mem48+4 is loaded into the segment register specified by opcode 302. Once the 48-bit pointer has been loaded into the segment register/general register pair, the pointer may be used to access memory.

When loading a segment register/general register pair, it is common to first load the offset into a temporary register, to then load the segment register, and only after the segment register load has been completed, to move the offset into the general purpose register. For reasons known to those skilled in the art, it is possible that the segment register load operation may fail. For a background on the details of segment register loading, and exception conditions that may be created during a segment load, attention is directed to U.S. Pat. No. 4,442,484 entitled "MICROPROCESSOR MEMORY MANAGEMENT AND PROTECTION MECHANISM" which is hereby incorporated by reference.

The commonly used load sequence is important. If the general purpose register is overwritten with the offset before the segment register has been loaded, and the segment register load fails, the contents of the general purpose register will be incorrect. In addition, once overwritten, the microprocessor is unable to restore the general purpose register to its previous condition. That is why all known microprocessors store the offset into a temporary register, and do not overwrite the general purpose register, until after the segment load has completed.

A problem with the prior art sequence is that additional processing time is required to first load the offset into a temporary register, and later transfer the contents of the temporary register into the general purpose register. If it is presumed that each step in the above described sequence requires a single clock cycle, then at least 25% of the instruction sequence is required, just to ensure that the general purpose register is not overwritten prior to a successful segment load.

What is needed is an apparatus and method that improves the execution of a pointer load operation. More specifically, what is needed is an apparatus and method that stores the offset directly into the general purpose register, but provides a mechanism for restoring the general purpose register if the segment load fails.

SUMMARY

To address the above-detailed deficiencies, it is an object of the present invention to improve the time required to load a pointer into segment and offset registers.

Accordingly, it is a feature of the present invention to provide a microprocessor that executes a load pointer macro instruction. The microprocessor includes an instruction register, a register file and a temporary register. The instruction register temporarily stores a sequence of micro instructions that perform the load pointer macro instruction. The register file is coupled to the instruction register and includes a segment register and an offset register. The register file outputs datum in the offset register during execution of a first micro instruction within the sequence. In addition, the first micro instruction loads an offset from a memory location into the offset register after the datum in the offset register is output. The temporary register is coupled to the register file, and temporarily stores the output datum during execution of the first micro instruction.

An advantage of the present invention is that by temporarily storing away the datum in the offset register, in the register stage of the microprocessor, before it is overwritten by the offset, in the write-back stage of the microprocessor, at least one instruction is removed from the micro instruction sequence, i.e., the instruction that is typically required to store the offset into a temporary register, until the segment load is complete.

A further object of the present invention is to provide a mechanism for restoring an offset register, should the segment load portion of the pointer load operation fail.

In another aspect, it is a feature of the present invention to provide a method for loading a pointer into a segment register and an offset register within a microprocessor. The method includes loading an offset into the offset register, loading a selector into the segment register, and loading a descriptor into the segment register, wherein the step of loading an offset into the offset register is performed prior to the step of loading a descriptor into the segment register.

An advantage of the present invention is that by loading the offset register prior to loading the descriptor, in instances where the descriptor load is successful, the pointer load operation is improved by at least 25%.

In yet another aspect, it is a feature of the present invention to provide a micro instruction sequence that loads a pointer from a memory into a segment register and an offset register, where the sequence is output from a translator and executed on a microprocessor. The micro instruction sequence includes a load offset instruction, a load selector instruction and a load descriptor instruction. The load offset instruction is output from the translator, and loads an offset from the memory, and stores the offset into the offset register. The load selector instruction is output from the translator, and loads a selector into the segment register. The load descriptor instruction is also output from the translator, and loads a descriptor into the segment register. The load offset instruction is executed by the microprocessor before the load descriptor instruction.

DESCRIPTION OF THE DRAWINGS

These and other objects, features, and advantages of the present invention will become better understood with regard to the following description, and accompanying drawings where.

DETAILED DESCRIPTION

Figure 4:
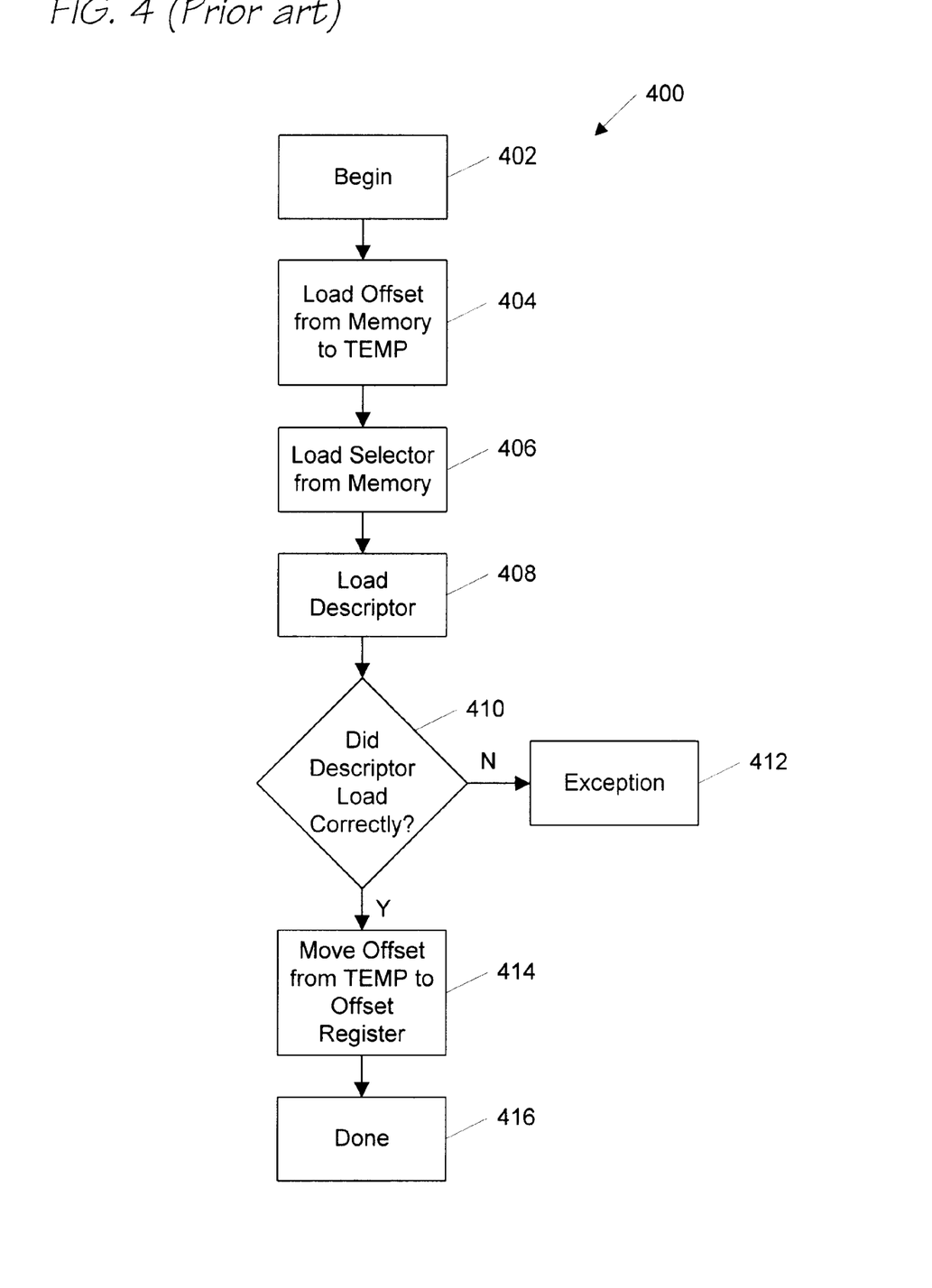
FIG. 4 is a flow chart illustrating the steps typically required to load a selector/offset pointer.

Referring to FIG. 4, a flow chart 400 is shown that illustrates a prior art micro instruction sequence that loads a pointer into a segment register/offset register pair. Instruction flow begins at step 402 and proceeds to step 404.

At step 404, a 32-bit offset is retrieved from memory, and stored into a temporary register TEMP. Instruction flow proceeds to step 406.

At step 406, a 16-bit selector is retrieved from memory, and placed into a temporary register. Instruction flow proceeds to step 408.

At step 408, the descriptor associated with the retrieved selector is retrieved from memory. In addition, several attributes of the descriptor are checked to verify the validity of the memory segment being loaded. If all of the checks pass, the selector and descriptor are stored into the segment register. Instruction flow proceeds to decision block 410.

At decision block 410, a test is performed to determine whether the descriptor loaded correctly. Actually, no specific instruction is executed to perform this test. Rather, if the descriptor load fails any of the validity checks, an exception is created, and instruction flow proceeds to an exception handler at step 412. However, if the descriptor loads correctly, instruction flow proceeds to step 414.

At step 414, the offset in the TEMP register is moved to the offset register. The pointer load is complete, and instruction flow proceeds to step 416.

Figure 5:
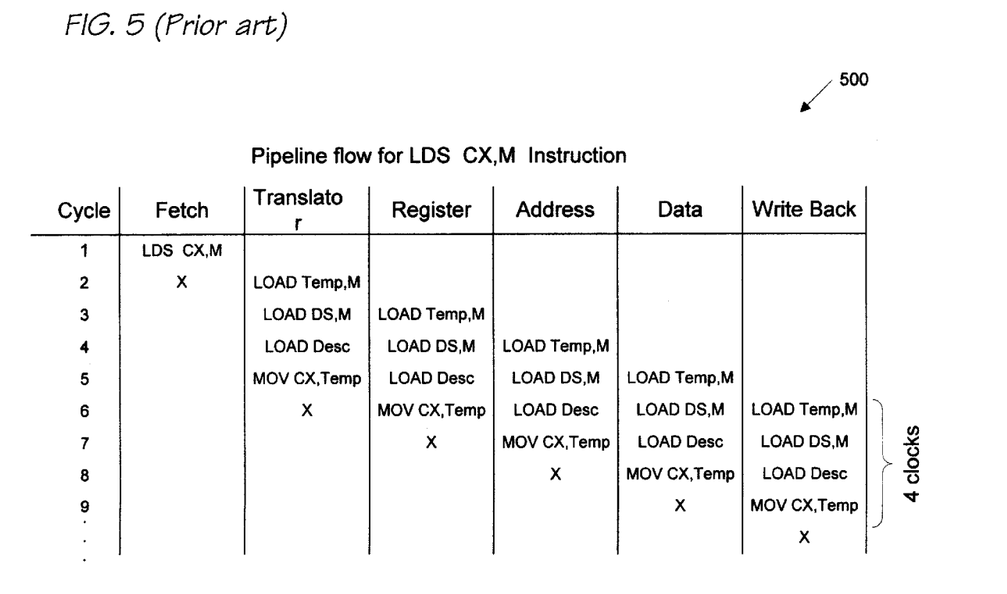
FIG. 5 illustrates instruction flow through a pipeline processor for micro instructions that perform the selector/offset load operation shown in FIG. 4.

Now referring to FIG. 5, a pipeline instruction flow table 500 is provided that illustrates specific prior art micro instructions that perform a pointer load, as they proceed through a six stage pipeline microprocessor. As will be further discussed below, with reference to FIG. 6, the stages of the pipeline processor include: Fetch; Translate; Register File; Address; Data; and Write-Back.

Execution of a load pointer instruction LDS CX,M begins at clock cycle 1 when the macro instruction is fetched into an instruction buffer. The LDS CX,M macro instruction is an x86 instruction that loads a 48-bit pointer into the DS segment register/CX offset register pair from memory address M.

During clock cycle 2, the LDS macro instruction is translated into a sequence of micro instructions that are executed by a pipeline microprocessor. The first micro instruction in the sequence is LOAD Temp,M. This instruction retrieves the offset for the pointer, and stores the offset into temporary register TEMP. The instruction is provided by the translate stage to an instruction register before the register stage.

During clock cycle 3, the first micro instruction in the sequence proceeds to the register stage. In addition, the second micro instruction in the sequence, LOAD DS,M, is provided by the translate stage to the instruction register. This instruction retrieves the selector from memory, and places the selector into the DS register. One skilled in the art should appreciate that the DS register is not actually overwritten until validation checks for the descriptor are passed.

During clock cycle 4, the first micro instruction in the sequence proceeds to the address stage, where the address for the memory location M is calculated. In addition, the second micro instruction in the sequence proceeds to the register stage. And, the third micro instruction in the sequence, LOAD Desc, is provided by the translator to the instruction register. This instruction retrieves the descriptor associated with the retrieved selector.

During clock cycle 5, the first micro instruction in the sequence proceeds to the data stage, where the offset is read from memory location M. In addition, the second micro instruction in the sequence proceeds to the address stage where the address for memory location M is calculated. And, the third micro instruction in the sequence proceeds to the register stage. Finally, the fourth and last micro instruction in the sequence, MOV CX,Temp, is provided by the translator to the instruction register. This instruction moves the offset from the Temp register into the general purpose register CX.

During clock cycle 6, the first micro instruction proceeds to the write back stage and causes the offset retrieved from memory location M to be written into the Temp register. In addition, the second micro instruction proceeds to the data stage and retrieves the selector from memory location M. The third micro instruction proceeds to the address stage where the address for the descriptor is calculated. The fourth micro instruction proceeds to the register stage, where the contents of the Temp register are provided to the following pipeline stage.

During clock cycle 7, the first micro instruction has completed and passed out of the pipeline. The second micro instruction proceeds to the write back stage where the retrieved selector is written into the DS segment register. The third micro instruction proceeds to the data stage where the descriptor is retrieved from memory location M. The fourth micro instruction proceeds to the address stage where no action is taken.

During clock cycle 8, the second micro instruction has completed and passed out of the pipeline. The third micro instruction proceeds to the write back stage where the descriptor is written into the segment register DS. The fourth micro instruction proceeds to the data stage where the contents of the Temp register are provided to the write back stage.

During clock cycle 9, the third micro instruction has completed and passed out of the pipeline. The fourth micro instruction proceeds to the write back stage where the contents of the Temp register are written into the offset register CX.

At the end of clock cycle 9, all micro instructions in the sequence to load the 48-bit pointer, have been completed. From a pipeline perspective, it has taken 4 instruction clocks to complete the pointer load operation. And, 1 of these clock cycles was needed just to temporarily store the offset. What will now be described is a method and apparatus that eliminates the need to temporarily store the offset.

Figure 6:
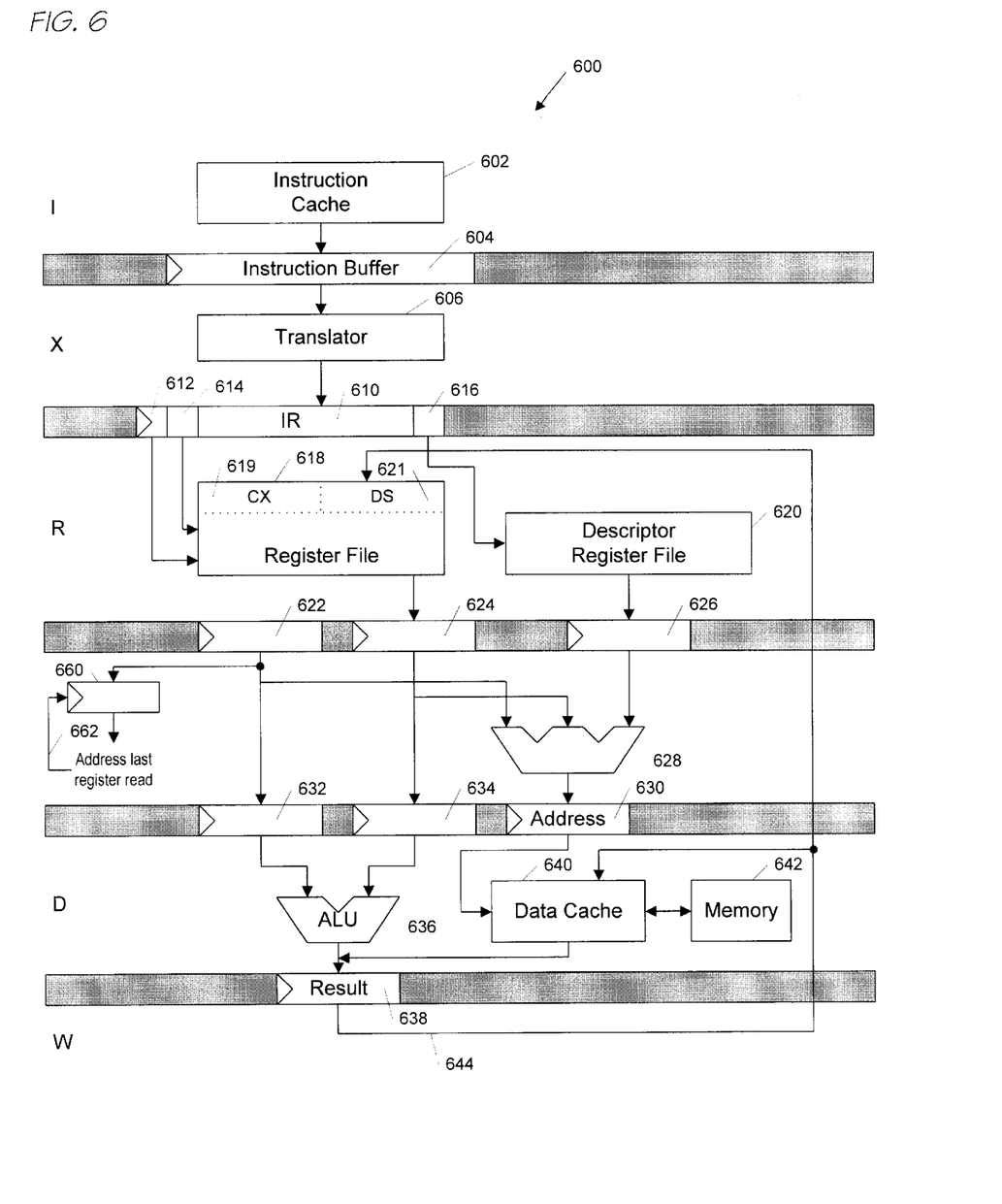
FIG. 6 is a block diagram of a pipeline processor that incorporates features of the present invention for improved selector/offset loading.

Referring now to FIG. 6, a block diagram of a portion of a pipeline microprocessor 600 is shown. The pipeline microprocessor 600 includes a Fetch stage (I), a Translate stage (X), a register stage (R), a data stage (D), and a write back stage (W). Operation of the microprocessor 600 will be discussed with particular reference to FIG. 7.

Figure 7:
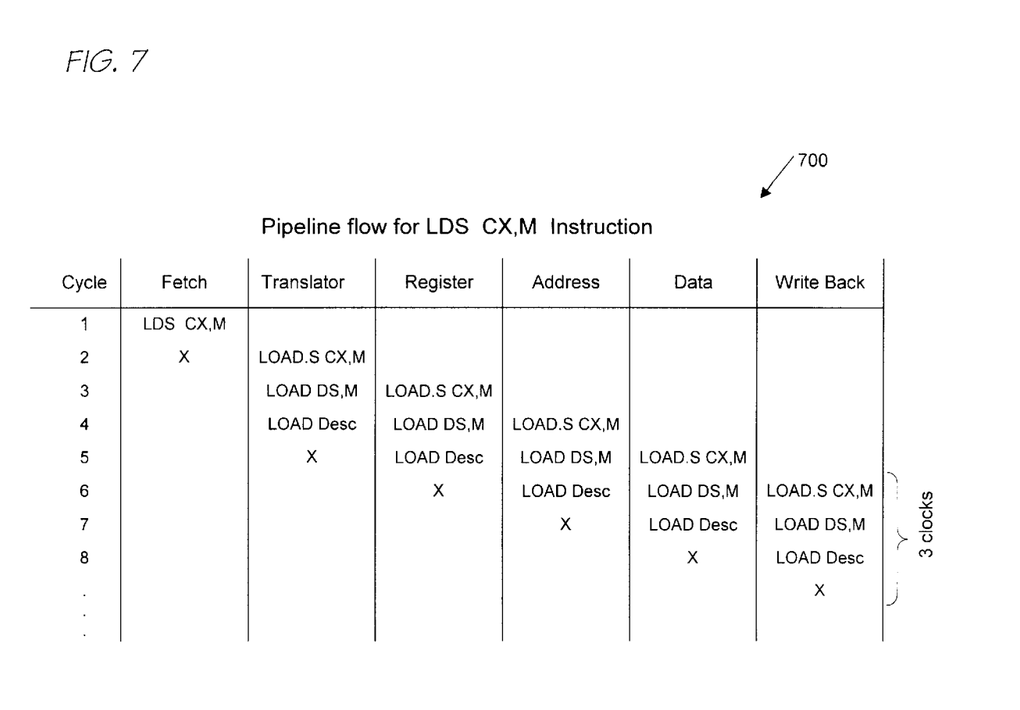
FIG. 7 illustrates instruction flow through a the pipeline processor of FIG. 6 of micro instructions for improved selector/offset loading.

In FIG. 7, a pipeline instruction flow diagram 700 is provided that illustrates procession of a pointer load micro instruction sequence, according to the present invention, through the microprocessor 600. Therefore, reference is made to both FIGS. 6 and 7.

The micro instruction sequence includes a first micro instruction for loading the offset, a second micro instruction to load the selector, and a third micro instruction to load a descriptor. One skilled in the art should appreciate that the number of micro instructions required to load a segment register with a selector/descriptor will vary, depending on the microprocessor. Numerous checks are required to validate a segment before it can be loaded, many of which will cause an exception. However, for ease of illustration, complexities associated with loading a segment register will be ignored.

For a more complete background, please see U.S. Pat. No. 5,787,495 entitled METHOD AND APPARATUS FOR SELECTOR STORING AND RESTORATION; U.S. Pat. No. 5,815,729 entitled METHOD AND APPARATUS FOR ON THE FLY DESCRIPTOR VALIDATION; and U.S. Pat. No. 5,822,607 entitled METHOD AND APPARATUS FOR FAST VALIDATION CHECKING FOR CODE AND DATA SEGMENT DESCRIPTOR LOADS, all assigned to Integrated Device Technology, and incorporated herein by reference.

During clock cycle 1, a pointer load macro instruction LDS CX,M is fetched from an instruction cache 602, and provided to an instruction buffer 604. The LDS CX,M macro instruction is similar to that discussed above with reference to FIG. 5.

During clock cycle 2, a translator 606, translates the macro instruction, and provides the first micro instruction in the sequence to an instruction register 610. The first micro instruction, LOAD.S CX,M, retrieves the 32-bit offset from memory location M, and stores the offset into general purpose register CX. In addition, the S suffix causes the microprocessor 600 to store the old value of CX into a temporary register, for later restoration, to be further discussed below. The instruction register 610 includes portions 612 and 614 for referencing particular operands in a register file 618. In addition, the instruction register 616 includes a portion 616 for referencing a particular descriptor in an associated descriptor register file 620.

During clock cycle 3, the first micro instruction proceeds to the register stage. The operand CX in the micro instruction causes the contents of the CX register 619 to be output to the temporary buffer 622. In addition, the S suffix of the load instruction causes the contents of the temporary buffer 622 to be stored into temporary register 660 during the next clock cycle. Also during clock cycle 3, the second micro instruction, LOAD DS,M, is provided by the translator 606 to the instruction register 610.

During clock cycle 4, the first micro instruction proceeds to the address stage where the memory address M is calculated by ALU 628, and provided to an address buffer 630. The second micro instruction proceeds to the register stage where operands used to calculate an address for M are retrieved from the register file 618 and the descriptor file 620. Also, the third micro instruction, LOAD Desc, is provided by the translator 606 to the instruction register 610.

During clock cycle 5, the first micro instruction proceeds to the data stage where the offset is retrieved from either the data cache 640, or the memory 642. The offset is retrieved and placed into a result register 638. The second micro instruction proceeds to the address stage where the address for the selector is calculated by the ALU 628, and placed into the address buffer 630. The third micro instruction proceeds to the register stage.

During clock cycle 6, the first micro instruction proceeds to the write back stage where the offset (in the result register 638) is written into the CX register 619 in the register file 618, via forward bus 644. It should be appreciated that the contents of the register CX 619 have been overwritten with the value of the offset retrieved from memory. At this point, the segment load has not yet completed. The second micro instruction proceeds to the data stage where the selector is retrieved from either the data cache 640 or the memory 642 and placed into the result register 638. The third micro instruction proceeds to the address stage where the address for the descriptor is calculated.

During clock cycle 7, the first micro instruction has completed and passed out of the pipeline. The second micro instruction proceeds to the write back stage where the selector is written from the result register 638 into the DS register 621 in the register file 618. The third micro instruction proceeds to the data stage where the descriptor is retrieved from either the data cache 640 or the memory 642 and placed into the result register 638. As mentioned above, numerous checks are made on the descriptor before it is stored into the descriptor register file 620, however, these have been ignored so as not to detract illustration of the present invention.

During clock cycle 8, the second micro instruction has completed and passed out of the pipeline. The third micro instruction proceeds through the write back stage where the descriptor is written into the descriptor register file 620. This completes the pointer load micro instruction sequence.

If the segment load operation was successful, the pointer load operation required only 3 instruction cycles, rather than the 4 instruction cycles described above in FIG. 5. In addition, if the segment load operation fails, and causes an exception, and the CX register 619 has already been overwritten by the first micro instruction, then an exception handler (not shown) can address the temporary register 660, via a signal line 662, to restore the contents of the CX register 619 to its original value.

Thus, the method and apparatus of the present invention reduces the number of instructions required to load a pointer by at least one micro instruction, and provides a mechanism to restore the offset register should a segment fail to load.

Figure 8:
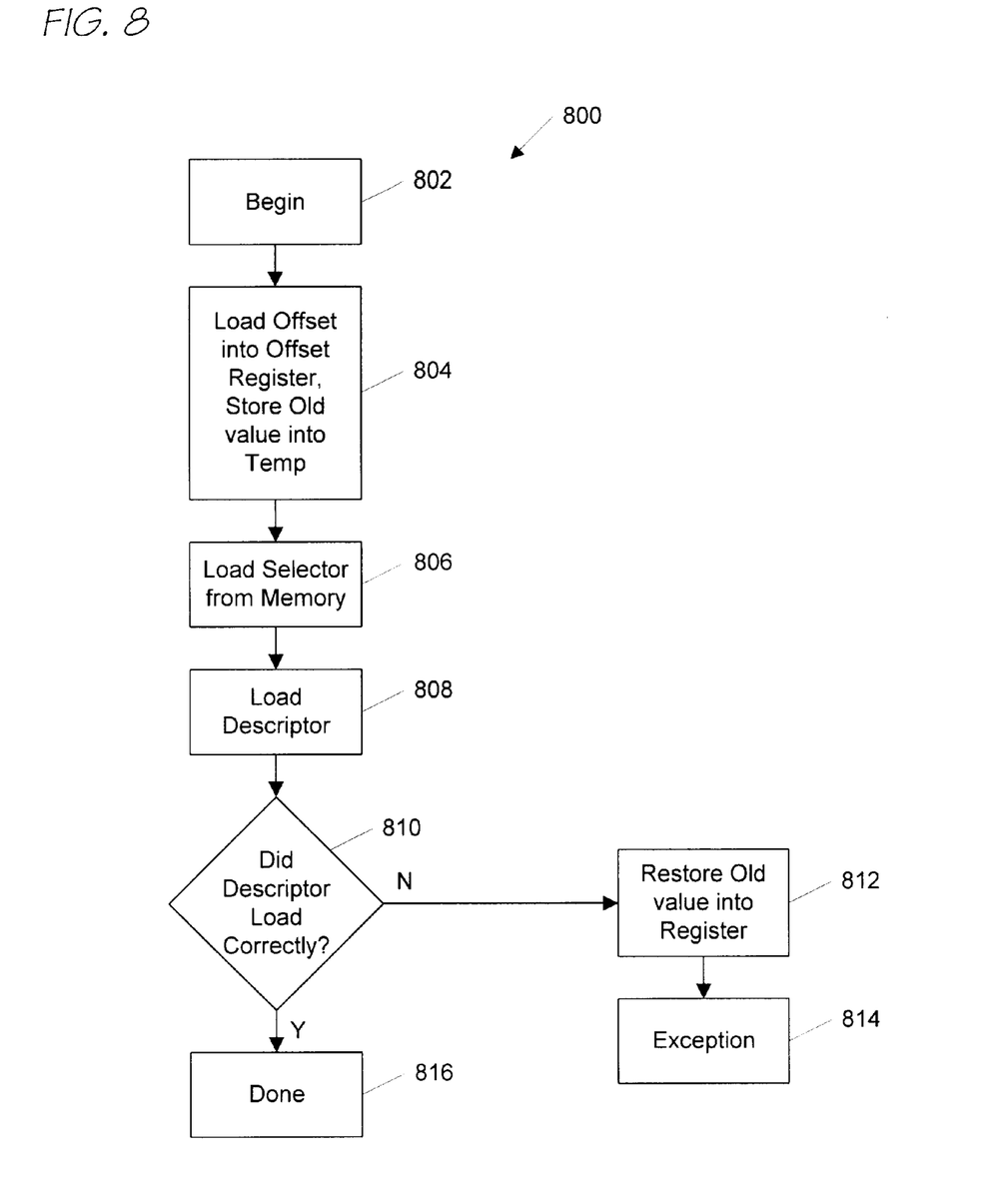
FIG. 8 is a flow chart illustrating a selector/offset load operation according to the present invention.

To further illustrate the method of the present invention, attention is now directed to FIG. 8. In FIG. 8, a flow chart 800 is shown. Operation begins at step 802 and proceeds to step 804.

At step 804, an offset is loaded into an offset register, and the old value of the offset register is stored into an addressable temporary register. Instruction flow proceeds to step 806.

At step 806, a selector is loaded from memory. Instruction flow proceeds to step 808.

At step 808, a descriptor is loaded from memory. Instruction flow proceeds to decision block 810.

At decision block 810, a test is performed to determine whether the selector/descriptor loaded correctly. As discussed above, this test is not actually performed after the selector/descriptor is loaded, but includes a series of tests that are performed in conjunction with the load. If the load fails, instruction flow proceeds to step 812.

At step 812, the old value of the offset register is retrieved from the temporary register, and written into the offset register. Instruction flow proceeds to step 814 where an exception handler handles the descriptor load failure.

If, at decision block 810, the selector/descriptor load did not fail, then instruction flow proceeds to step 816 where the pointer load operation completes.

Although the present invention has been described in considerable detail with reference to certain preferred versions thereof, other versions are possible. For example, the temporary register associated with the general purpose register, was illustrated in FIG. 6 within the address stage of the pipeline. It should be appreciated that this register could also be located within the register file 618, or in any other addressable location. An aspect of the present invention is that no instruction time is needed to insure against defective segment load operations during a pointer load operation.

Those skilled in the art should appreciate that they can readily use the disclosed conception and specific embodiments as a basis for designing or modifying other structures for carrying out the same purposes of the present invention. In addition, it should be understood that various changes, substitutions and alterations can be made herein without departing from the spirit and scope of the invention as defined by the appended claims.

We claim:

1. A microprocessor for executing a load pointer macro instruction, the microprocessor comprising:
   an instruction register, for temporarily storing a sequence of micro instructions that perform the load pointer macro instruction;
   a register file, coupled to said instruction register, said register file comprising a segment register and an offset register, said register file outputting datum in said offset register during execution of a first micro instruction within said sequence, wherein said first micro instruction loads an offset from a memory location into said offset register after said datum in said offset register has been output; and
   a temporary register, coupled to said register file, for temporarily storing said output datum during execution of said first micro instruction, said temporary register allowing said output datum to later be retrieved and restored back into said offset register if an exception occurs during execution of said sequence.

2. The microprocessor, as recited in claim 1, wherein the microprocessor is a pipeline microprocessor.

3. The microprocessor, as recited in claim 1, wherein said instruction register stores said sequence of micro instructions, one at a time, for later execution by the microprocessor.

4. The microprocessor, as recited in claim 1, wherein said register file further comprises a plurality of segment registers.

5. The microprocessor, as recited in claim 1, wherein said segment register further comprises a selector register and a descriptor register.

6. The microprocessor, as recited in claim 1, wherein said segment register comprises a 16-bit selector.

7. The microprocessor, as recited in claim 1, wherein said offset register is a 32-bit register.

8. The microprocessor, as recited in claim 1, wherein said first micro instruction comprises a first operand referencing said offset register.

9. The microprocessor, as recited in claim 8, wherein said first micro instruction further comprises a second operand referencing said memory location.

10. The microprocessor, as recited in claim 8, wherein said first micro instruction comprises a temp store indicator causing said datum in said offset register to be stored into said temporary register, prior to said offset from a memory location being stored into said offset register.

11. The microprocessor, as recited in claim 1, wherein said output datum is temporarily stored in said temporary register to allow later retrieval of said datum by the microprocessor.

12. The microprocessor, as recited in claim 11, wherein the microprocessor retrieves said datum from said temporary register, and restores said datum into said offset register if an exception occurs during execution of said load pointer macro instruction.

13. The microprocessor, as recited in claim 12, wherein said exception occurs during execution of a plurality of micro instructions within said sequence that load said segment register.

14. The microprocessor, as recited in claim 1, wherein said sequence comprises three micro instructions.

15. The microprocessor, as recited in claim 1, wherein said sequence of micro instructions comprises:

said first micro instruction, for loading said offset register with said offset, and for temporarily storing said datum in said temporary register;

a second micro instruction, for loading a selector into said segment register; and a third micro instruction, for loading a descriptor into said segment register.

16. The microprocessor, as recited in claim 1, further comprising a data stage, coupled to said register file, said data stage for retrieving said offset from said memory location.

17. The microprocessor, as recited in claim 16, wherein said data stage retrieves said offset in a clock cycle after said datum is stored in said temporary register.

18. A method for loading a pointer into a segment register and an offset register within a microprocessor, the method comprising the steps of:

loading an offset into the offset register, and storing the old contents of the offset register into a temporary register;

loading a selector into the segment register; and loading a descriptor into the segment register;

wherein said step of loading an offset into the offset register is performed prior to said step of loading a descriptor into the segment register.

19. The method for loading a pointer, as recited in claim 18, wherein said step of loading an offset into the offset register further comprises the steps of:

retrieving datum from the offset register; and storing the datum in a temporary register, prior to writing the offset into the offset register.

20. The method for loading a pointer, as recited in claim 19, wherein said step of loading an offset into the offset register is performed by a single micro instruction.

21. The method for loading a pointer, as recited in claim 18, wherein the pointer is a 48-bit value.

22. The method for loading a pointer, as recited in claim 18, wherein the pointer is formed using the offset as the lower 32-bits of an address, and using the selector as the upper 16-bits of the address.

23. The method for loading a pointer, as recited in claim 18, wherein said steps of loading a selector and loading a descriptor perform a segment register load.

24. The method for loading a pointer, as recited in claim 23, wherein an exception may occur during said step of loading a descriptor.

25. The method for loading a pointer, as recited in claim 24, wherein if an exception occurs, the method further comprises the step of:

restoring the offset register with datum that was stored therein prior to being overwritten by the offset.

26. The method for loading a pointer, as recited in claim 18, wherein the method is performed in three micro instruction clock cycles.

* * * * *